US009883659B2

(12) United States Patent
Kuehlmann

(10) Patent No.: US 9,883,659 B2
(45) Date of Patent: Feb. 6, 2018

(54) FEEDING STATION FOR POULTRY CHICKS

(71) Applicant: Farmer Automatic GmbH & Co. KG, Laer (DE)

(72) Inventor: Franz Josef Kuehlmann, Laer (DE)

(73) Assignee: Farmer Automatic GmbH & Co KG, Laer (DE)

( * ) Notice: Subject to any disclaimer, the term of this patent is extended or adjusted under 35 U.S.C. 154(b) by 0 days.

(21) Appl. No.: 14/801,986

(22) Filed: Jul. 17, 2015

(65) Prior Publication Data

US 2015/0327519 A1    Nov. 19, 2015

Related U.S. Application Data

(63) Continuation of application No. PCT/EP2014/053012, filed on Feb. 17, 2014.

(30) Foreign Application Priority Data

Feb. 15, 2013  (DE) .................... 20 2013 100 686 U

(51) Int. Cl.
*A01K 39/014* (2006.01)
*A01K 39/01* (2006.01)

(52) U.S. Cl.
CPC ............ *A01K 39/014* (2013.01); *A01K 39/01* (2013.01)

(58) Field of Classification Search
CPC ................................ A01K 39/01; A01K 39/014
USPC ............. 119/52.1, 52.4, 57, 57.1, 57.2, 57.4, 119/57.92, 58, 59
See application file for complete search history.

(56) References Cited

U.S. PATENT DOCUMENTS

| | | | | |
|---|---|---|---|---|
| 1,749,808 A | * | 3/1930 | Greene ................ | A01K 39/014 119/61.3 |
| 2,782,761 A | * | 2/1957 | Martin .................. | A01K 39/01 119/57.2 |
| 3,077,182 A | * | 2/1963 | Jordan .................. | A01K 39/01 119/57.2 |
| 3,157,273 A | * | 11/1964 | Robinson, Jr. ......... | A01K 39/01 119/901 |
| 3,250,250 A | * | 5/1966 | Woock .................. | A01K 39/01 119/57.2 |
| 3,272,400 A | * | 9/1966 | Van Huis ............. | A01K 5/0208 119/57.2 |
| 3,285,230 A | * | 11/1966 | Van Huis ............... | A01K 39/01 119/51.01 |

(Continued)

FOREIGN PATENT DOCUMENTS

GB        1033706 A  *  6/1966  ............ A01K 39/01

*Primary Examiner* — Joshua D Huson
*Assistant Examiner* — Ebony Evans

(57) ABSTRACT

A chick feeding station having an elongate trough for holding poultry feed, a conveyor which is placed in the trough and moves feed in the longitudinal direction of the trough, and deflectors and supports that provide chick safety. The conveyor is a chain conveyor with flights. The deflectors are mounted on the chick feeding station such that they extend from just above the conveyor flights and obliquely upward in the direction of travel of the conveyor, to move a chick to an upper level of the trough. A support for each deflector is also provided in the trough, the supports extending above the flights in the longitudinal direction of the trough, all the way to and through the deflectors.

9 Claims, 4 Drawing Sheets

(56) References Cited

U.S. PATENT DOCUMENTS 4,351,273 A * 9/1982 Holland ................ A01K 39/01
 119/51.01
4,603,657 A * 8/1986 Peckskamp ............ A01K 39/01
 119/457

* cited by examiner

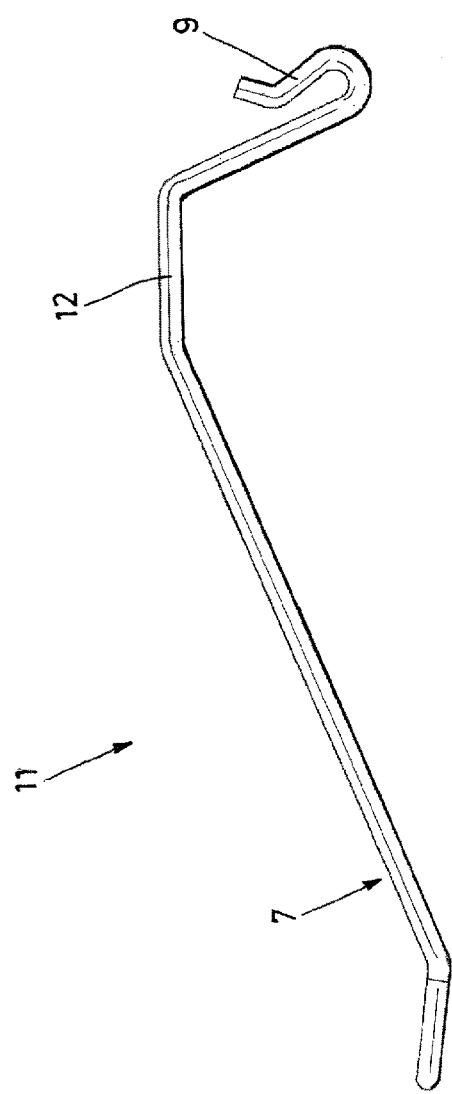
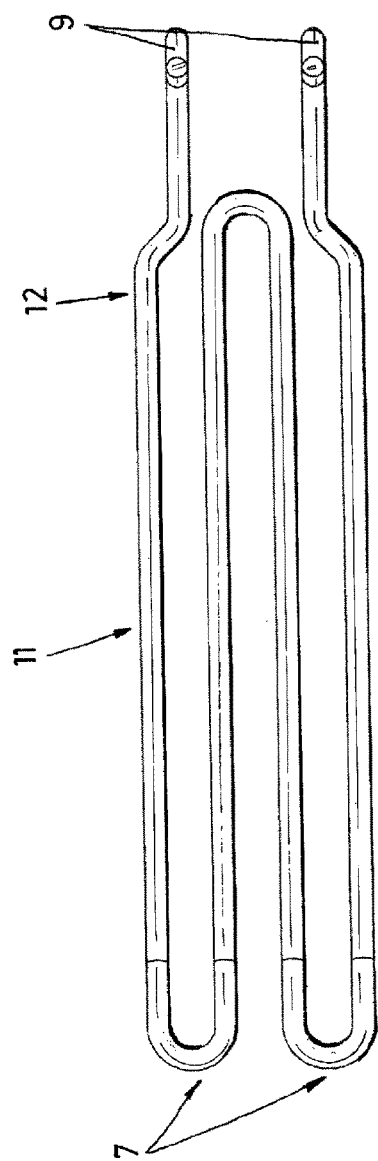

FEEDING STATION FOR POULTRY CHICKS

BACKGROUND INFORMATION

Field of the Invention

The invention relates to the field of poultry feeding stations. More particularly, the invention relates to chick-safety deflector devices in such feeding stations.

Discussion of the Prior Art

Feeding stations for poultry chicks are known in the industry. These feeding stations have a long trough and a conveyor that extends along the trough, carrying feed. It can happen, that chicks, also called fledglings, get into the trough and are then carried by the conveyor apparatus the length of the trough, i.e., they "ride along" on the conveyor. This is a problem, because the chicks or fledglings can get injured on the conveyor, for example, they can get injured on the separator panels that extend into the trough, or at the end of the trough, or get caught and injured on other installations that exist in the trough. For this reason, conventional feeding stations have so-called deflectors. These may be, for example, a type of tongue that extends diagonally from down near the flights on the conveyor upwardly in the direction of travel of the conveyor. The fledglings riding on the conveyor get pushed up against the deflector and are then automatically lifted up high enough, so that they can then leave the trough on their own.

The geometry of the conveyor flights determines how deep a deflector can extend into the trough. Obviously, the deflectors cannot collide with the flights. Also, a certain minimum height of the flights is needed to provide a conveyor that effectively transports the feed. But the greater the height of the flights, the greater the gap between the bottom of the trough and the lower end of the deflector, and when the gap exceeds a certain height, it can't be ruled out, that despite the deflectors, chicks can get hung up in this gap and be unable to free themselves from the trough.

What is needed, therefore, is an improved poultry chick feeding station, such, that the station provides the greatest possible safety for the chicks, as well as the greatest possible access to the feed. What is further needed, is such a chick feeding station that has a high-performance conveyor.

BRIEF SUMMARY OF THE INVENTION

The invention is a chick feeding station that includes the conventional trough and conveyor, two or more chick-safety deflectors, and a corresponding number of supports. The deflectors according to the invention extend in the longitudinal direction of the trough and are arranged such, that a support extends above the conveyor, in the longitudinal direction of the trough, all the way to a deflector. In other words, the supports serve as guard rails that prevent the chicks from standing directly on the conveyor or conveyor flights. Even if the foot of a chick should get in between the deflector and the trough floor or between the deflector and a conveyor flight, the chick can easily reach the support and free itself, so that it can then readily escape from the trough as a next step. The chick feeding station according to the invention provides optimal protection for the chicks, because the distance between the bottom of a deflector and the bottom of the trough, i.e., the gap that is necessary because of the conveyor flights, is unimportant as far as the safety of the chicks is concerned.

The support is similar to a perch and is referred to a "support" because it is possible for a chick to stand on and be supported by it. The plurality of supports provide the chicks with the ability to stand inside the trough, yet prevent them from standing on the moving elements of the conveyor. Thus, the supports not only reduce the likelihood that a chick will be carried on the conveyor in the direction of travel of the conveyor, but they also allow the chick to leave the trough again at practically any place in the trough. Should the chick, however, be carried in the longitudinal direction of the trough, then it is eventually carried up against the deflectors, which then lift the chick up, making it easier for it to escape the trough.

The supports may have a relatively small cross-section, so that the use of two or more such supports does not occupy much of the inner space of the trough, and, as a result, feed is made available over a large surface area in the trough, thereby providing the chicks with optimal access to the feed. The supports need only have a dimension large enough to serve as a perch and could possibly be made, for example, of taut ropes. Preferably, however, the supports are constructed as rods, i.e., of non-bending elongated elements of material that is inherently stiff, i.e., with very little sag compared to the sag of a rope. In particular, the high tensile forces that would be necessary to pull a rope taut are not necessary with the rods, which means that the mechanical loading on the chick feeding station can be held to a minimum. The supports also preferably have a rounded cross-section, in order to avoid sharp edges or corners with which the chick could possibly come into contact and which could possibly present a safety risk for the chick.

Each deflector may have an opening in it, so that the support may extend through this opening. This provides several advantages. For one, it simplifies production of the poultry chick feeding station according to the invention, because it is not necessary to provide a support with the precise dimensions to reach the deflector, but rather, the support may extend through the deflector for some distance, the distance not being relevant to the safety of the chick. With this type of deflector it is particularly easy to retrofit already existing chick feeding stations with the supports according to the invention, without requiring taking precise measurements, because the supports do not have to have a length that precisely fits the length of the conveyor up to the individual deflector. Allowing the support to extend through the deflector provides a kind of tolerance compensation. Consequently, the support may be pre-fabricated with a certain oversize and may then extend through the deflector the corresponding oversize distance. This configuration of supports and deflector with the opening also makes it possible to assemble the supports quickly and easily. These elements may be pre-fabricated in the most cost-effective way to specified standardized lengths, and, thus, do not have to be adapted with millimeter precision to the particular dimensions of an existing chick feeding station.

Advantageously, when the deflectors are not constructed as wide tongues made from sheet material, but rather, are made of narrower material, such as, for example, round bar stock or wire, two deflectors may be placed side-by-side, so as to ensure the effectiveness of chick deflection across the entire width of the trough. In this arrangement of two deflectors side-by-side, the distance between the deflectors is intentionally kept to a large distance that is sufficiently large to avoid a narrow gap in which the legs of the chick could become trapped, for example. This distance can advantageously increase in the upward direction. This ensures that even larger, i.e., older chicks can free their legs from the space between the two deflectors, should they happen to get between the deflectors. On the other hand, the distance is kept so small, even at its widest point, that smaller chicks cannot fall through the opening between the deflectors. The proper dimension may be determined in a first embodiment, based on experimental values that are determined at the particular facility, whereby the two deflectors are then assembled with this distance dimension.

In a second embodiment, the distance between the two deflectors is adjustable, for example, is adaptable to the local conditions, such as to the age or size of the chicks. Thus, providing a traverse across a section of the trough and fastening the deflectors adjustably to the traverse, for example, by using screws, allows the distance dimension to be adjusted by the operator of the chick feeding station, who may change the distance by loosening the screws.

The supports may also be removably attached. This allows for a quick and inexpensive assembly of the supports, be it on new production or a retrofit of a chick feeding station. The removable attachment makes it possible to disassemble the supports quickly and inexpensively, for example, if the supports are damaged, or when the chick feeding station needs to be re-configured. For example, when feeding larger chicks, it is desirable that the largest possible cross-section of the trough be filled with feed, and, in the interest of providing this greater amount of feed, the supports may be removed from the trough. With larger chicks, the problematic of chicks getting caught in the gap between the bottom of the deflector and the bottom of the trough or the conveyor flight no longer exists, because these older animals can readily free themselves from such a situation or are capable of avoiding the situation right from the start.

Each support may be formed with an eyelet at its assembly end and a retainer provided that is a pin that is then threaded through this eyelet. Such a construction has the advantage that assembly/disassembly of the support onto the chick feeding station does not require any tools and can be done very speedily. It may be particularly advantageous that the support have just a single eyelet, so that, here, too, in the interest of the previously mentioned tolerance compensation, it is not necessary to precisely fit the support to a specified distance dimension. In other words, the deflector has an opening and the support has an eyelet at one end. The support is mounted on the retainer and then extends through the deflector, so that pre-fabricating this type of support with a slight oversize is advantageous, in that the support is simple to install and the oversize guarantees that the support extends all the way up to and through the deflector.

Cage systems are often used in poultry raising facilities, in which different sections in the cage system contain different populations of chicks. If, for example, the chick feeding station runs through such a cage system, it is important to ensure that the chicks from one section cannot migrate into another section. The traverse mentioned above may be provided in the trough at the place where the individual sections of the cage system abut each other. The traverse ensures that adjacent individual sections of the cage system are separated from each other and, in this way, prevents a chick from migrating from one section to the adjacent section. To this end, each of the deflectors may be mounted on such a traverse. The retainer for holding the support may also be provided on the same traverse. One traverse, thus, serves both as the retainer on which the support is held and the deflector, whereby another support from an adjacent section extends up to the deflector on the one traverse. This embodiment of the chick feeding station requires no additional fastener elements on the trough of the chick feeding station; rather, it is possible to immediately assemble the supports on the traverses that are already there.

The conveyor in the chick feeding station according to the invention may be constructed to be very efficient, because the conveyor flights can be relatively high. This increases the performance of the conveyor, because the higher flights convey more feed. And, as mentioned above, with the supports according to the invention, the increased gap due to the higher flights does not provide an increased risk to the safety of the chicks. The feed conveyor is advantageously a chain conveyor that runs along the middle of the trough in a conventional manner. Conveyor flights extend from both sides of the chain. Preferably, the combination of deflector and support as described above is arranged along each side of the conveyor chain.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 3 illustrates a side plane view of the combination element as a bent wire.

FIG. 4 illustrates a top plane view of the combination element of FIG. 3, showing a dual configuration of the combination element.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
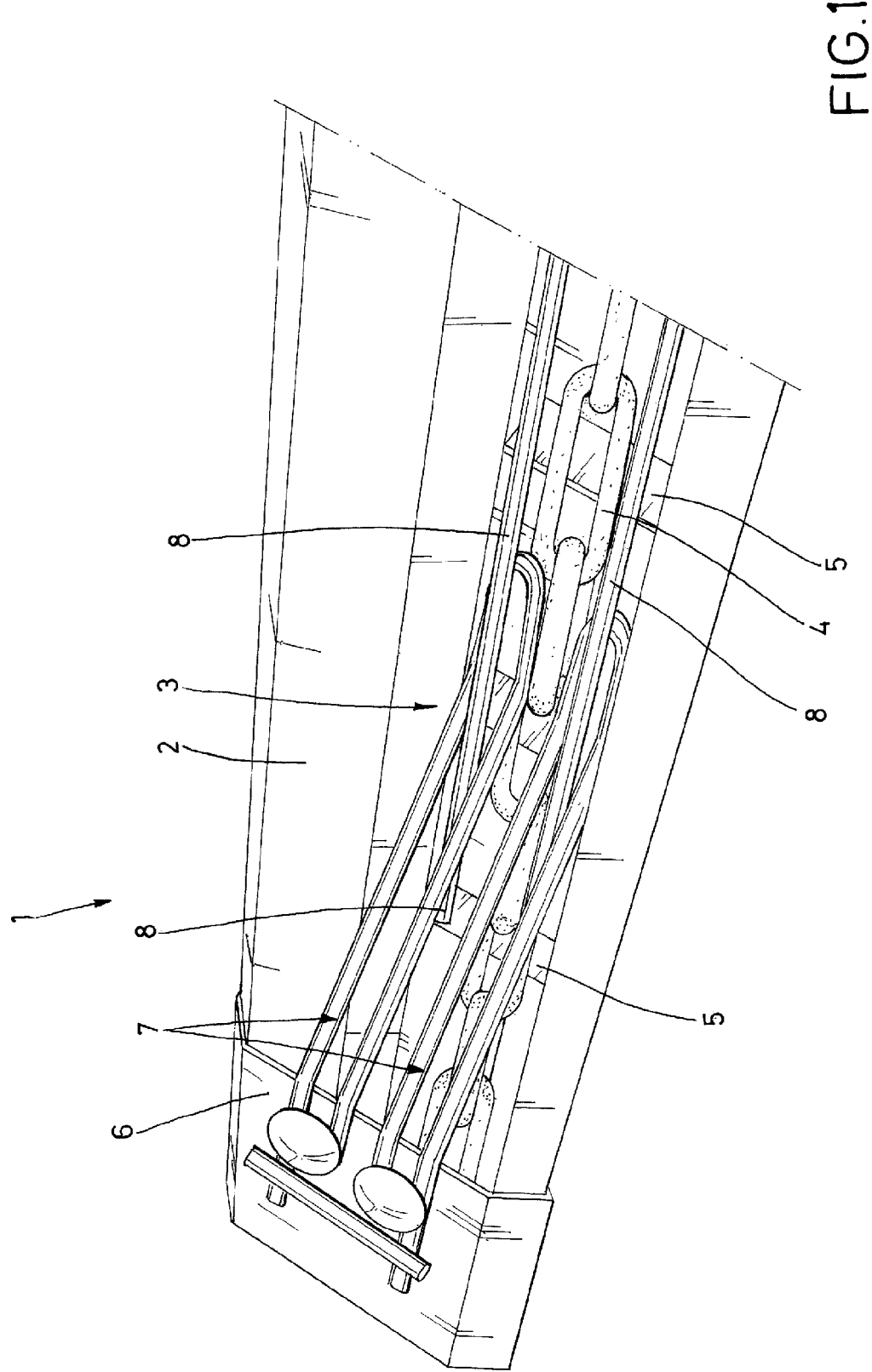
FIG. 1 is a perspective view of a section of a chick feeding station in the area of a traverse, showing the side of the traverse that has the deflectors.

FIG. 1 illustrates a chick feeding station 1 according to the invention. Only a section of the chick feeding station 1 is shown, but it is understood that the station may have many repeating sections of the one shown, plus other conventional components. The chick feeding station 1 according to the invention comprises a trough 2, a conveyor 3, a traverse 6, a deflector 7, and a support 8.

The trough 2 is constructed as an elongate channel and the conveyor 3 is a conventional chain conveyor 4 having a plurality of conveyor flights 5. As shown, the conveyor 3 extends centrally along the bottom of the trough 2 and the direction of travel of the conveyor shown in this figure is from right to left. The traverse 6 is shown on the left edge of the chick feeding station 1, spanning the width of the trough 2. Two deflectors 7 are shown mounted on the traverse 6 and extending diagonally downward into the trough 2, to just above the flights 5.

Each deflector 7 is constructed as a wire bracket, made from steel round stock, the bracket having two elongate sides with an opening 7A therebetween. The dimension of the opening 7A and the distance between the deflectors 7 and the respective walls of the trough 2 result in narrow gaps in the direction of travel of the conveyor 3 that are so small, that a chick is reliably stopped by the deflectors 7 from traveling further in the direction of travel of the conveyor, and is lifted up, to facilitate the chick's escape from the trough 2.

Supports 8 are provided on both sides of the conveyor chain 4 that extend alongside the conveyor 3 and through opening 7A in the deflectors 7. Each support 8 is made of steel round stock or wire.

Figure 2:
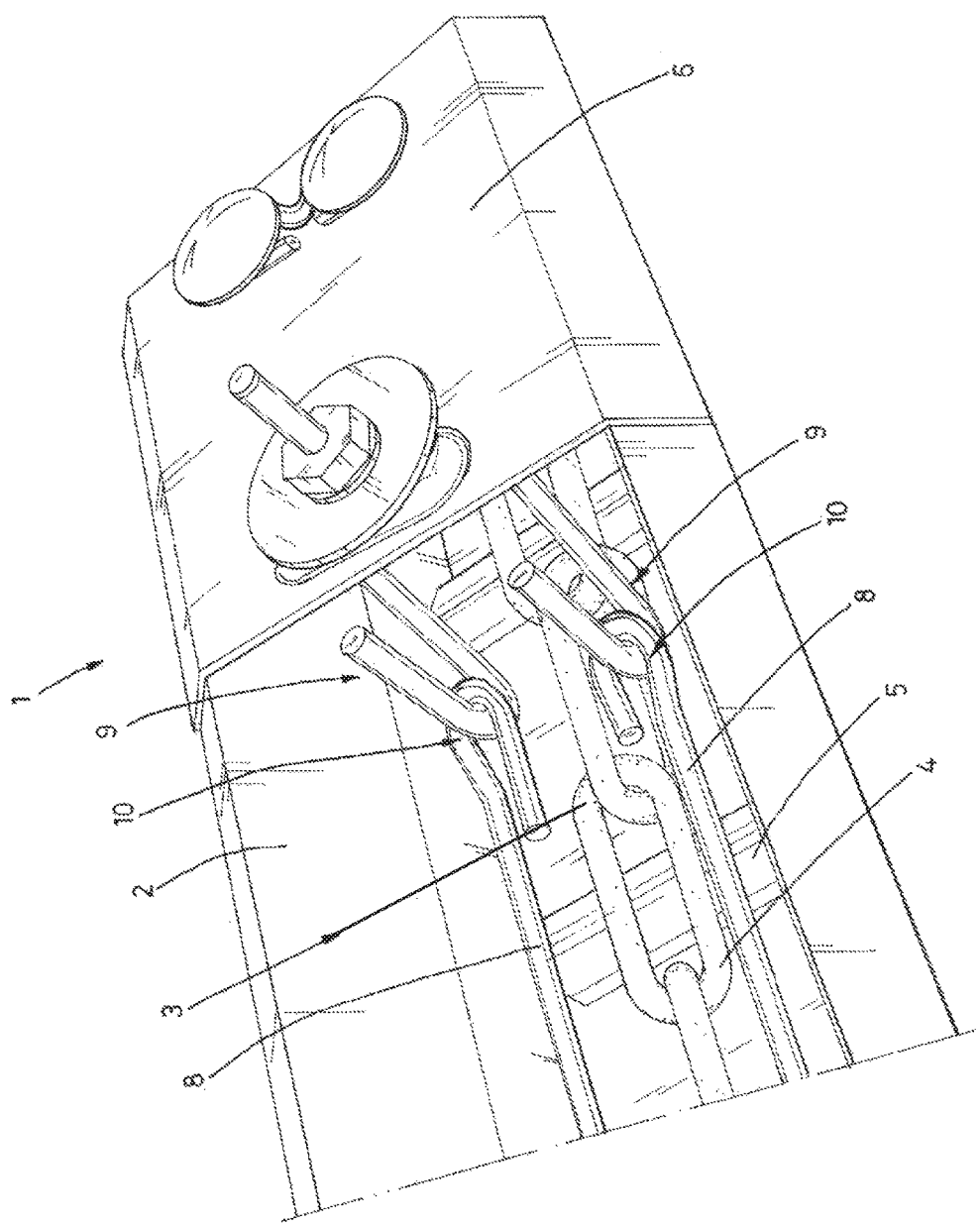
FIG. 2 is a perspective view of the opposite side of the traverse shown in FIG. 1.

FIG. 2 illustrates a second traverse 6, one that is assembled on the chick feeding station 1 at another section of the chick feeding station that is upstream in the direction of conveyor travel from the traverse shown in FIG. 1. The supports 8 have a mounting end that is formed as an eyelet 10. Two retainers 9 are securely fastened to this second traverse 6, each retainer 9 embodied as a pin. The eyelet 10 is slipped over this pin 9 as a means of assembling the support 8 on the traverse 6.

FIGS. 3 and 4 illustrate a combination element 11 that forms both two deflectors 7 and two retainers 9 and is constructed from small round bar stock or wire. An assembly section 12 is formed between the deflectors 7 and the retainers 9. The chick feeding station 1 has a series of sections, each section divided by the traverse 6. In this embodiment, the combination element 11 is fastened to a first traverse 6, and the retainers 9 from this first traverse 6 hold the supports 8 that then extend toward the combination element 11 mounted on a second traverse 6. i.e., the next traverse in the series.

Figure 5:
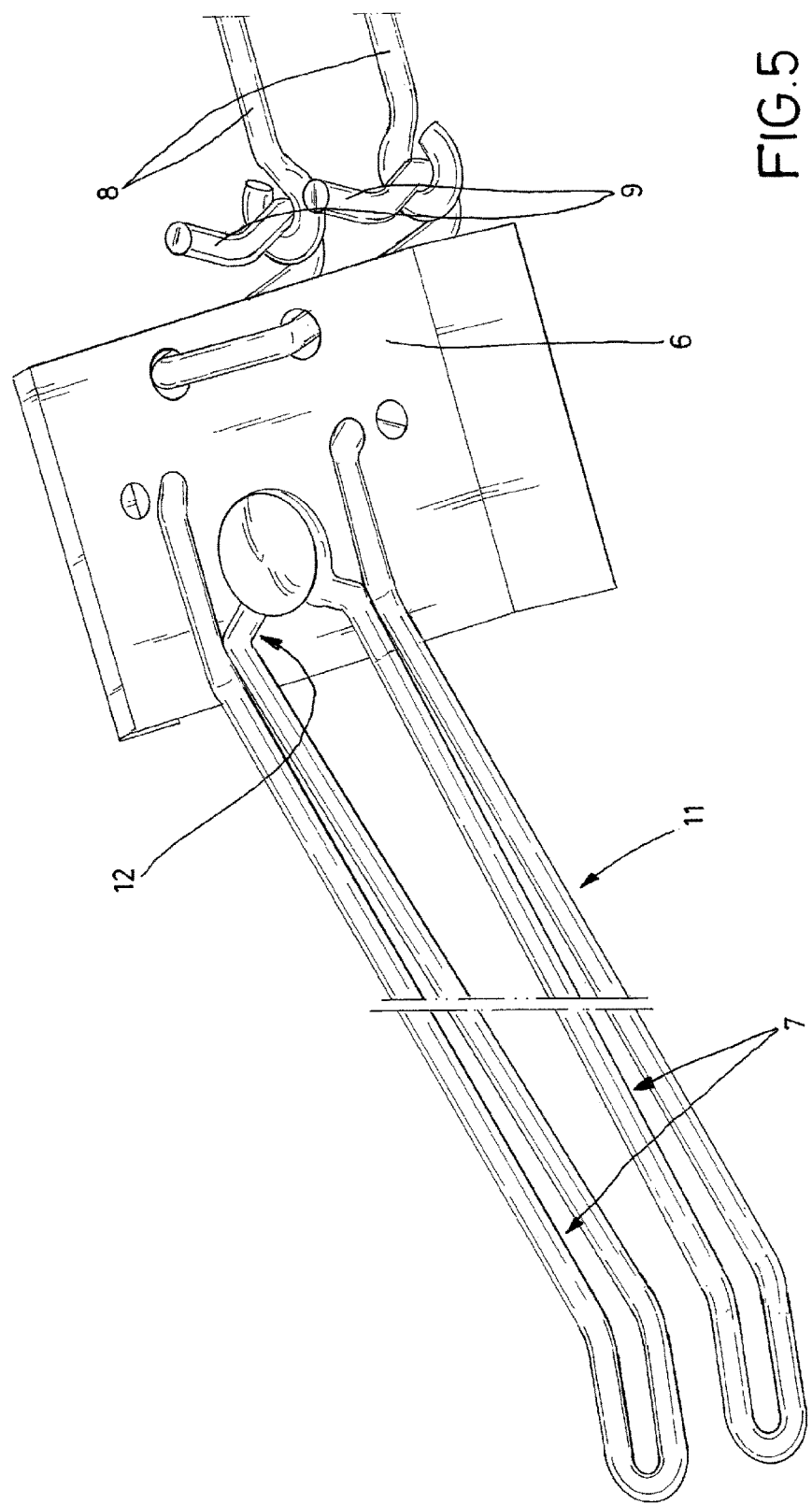
FIG. 5 is a perspective view of an additional embodiment of the combination element.

FIG. 5 is a perspective view of a second embodiment of the combination element 11. In this embodiment, too, the supports 8 are assembled on the combination element 11, which in turn is fastened to the traverse 6. The combination element 11 is also fashioned from small diameter round bar stock or wire. It differs from the embodiment shown in FIGS. 3 and 4, in that the distance between the two deflectors 7 increases toward the upper or assembly end of the combination element 11.

Referring again to FIGS. 1 and 2, it is noted that the conveyor chain 4 itself serves as a safety mechanism that prevents the chicks, i.e., their feet, from getting caught beneath the deflectors 7. The chain 4 passes through a space between the two deflectors 7, thereby reducing a gap between the links of the chain 4 and the sides of the deflectors 7 to a size that is too small for the chick's foot to pass through.

It is understood that the embodiments described herein are merely illustrative of the present invention. Variations in the construction of the chick feeding station may be contemplated by one skilled in the art without limiting the intended scope of the invention herein disclosed and as defined by the following claims.

What is claimed is:

1. A chick feeding station comprising:
   a trough for holding feed for chicks;
   a conveyor that extends in a longitudinal direction in the trough, the conveyor having a plurality of conveyor flights;
   at least two deflectors that extend upwardly from inside the trough in a direction of travel of the conveyor; and
   at least two supports provided in the trough above the conveyor flights, the at least two supports constructed as rods or taut ropes to serve as a perch;
   wherein each one of the at least two supports extends in the longitudinal direction of the trough a distance that reaches a corresponding deflector; and
   wherein each one of the at least two deflectors has an opening through which a corresponding one of the at least two supports extends.

2. The chick feeding station of claim 1, wherein the at least two deflectors are constructed as a wire bracket.

3. The chick feeding station of claim 1, wherein the at least two supports are removably attached.

4. The chick feeding station of claim 1, wherein one or more retainers are fixedly attached to the trough and wherein the at least two supports form eyelets that are removably attached to one or more retainers.

5. The chick feeding station of claim 1, further including a first traverse and a second traverse, one spanning each end of the trough wherein the trough is an elongate channel having a first end and a second end and wherein the first traverse spans the first end and the second traverse spans the second end, and wherein the at least two deflectors are mounted to the first traverse and wherein the at least two supports are mounted on the one or more retainers that are attached to the second traverse.

6. The chick feeding station of claim 1, wherein the conveyor is a chain conveyor that runs along the middle of the trough and wherein at least one support and at least one deflector are located on each side of the conveyor.

7. The chick feeding station of claim 1, wherein the at least two supports are constructed as rods.

8. The chick feeding station of claim 7, wherein the at least two supports have rounded cross-sections.

9. The chick feeding station of claim 1, wherein the at least two deflectors are arranged side by side and wherein the distance between the two deflectors increases in the upward direction.

\* \* \* \* \*